(12) United States Patent
Cohen

(10) Patent No.: US 8,017,877 B1
(45) Date of Patent: Sep. 13, 2011

(54) PORTABLE COLLAPSIBLE SCALE

(76) Inventor: M. Richard Cohen, Destin, FL (US)

(*) Notice: Subject to any disclaimer, the term of this patent is extended or adjusted under 35 U.S.C. 154(b) by 333 days.

(21) Appl. No.: 12/364,099

(22) Filed: Feb. 2, 2009

(51) Int. Cl.
*G01G 21/28* (2006.01)

(52) U.S. Cl. .......................... 177/126; 177/238

(58) Field of Classification Search .......... 177/126–127, 177/238
See application file for complete search history.

(56) References Cited

U.S. PATENT DOCUMENTS

| | | | |
|---|---|---|---|
| 79,965 A | 7/1868 | Fellows | |
| 2,040,037 A | 5/1936 | Wily | |
| 3,612,744 A * | 10/1971 | Thomas | 174/36 |
| 3,961,675 A | 6/1976 | Siegel | |
| 4,023,633 A | 5/1977 | Swersey et al. | |
| 4,033,420 A | 7/1977 | De Masters | |
| 4,114,736 A * | 9/1978 | Scherenberg | 191/12.4 |
| 4,281,730 A | 8/1981 | Swersey et al. | |
| 4,499,341 A * | 2/1985 | Boyd | 191/12.4 |
| 4,537,266 A | 8/1985 | Greenberg | |
| 4,576,350 A | 3/1986 | Bond | |
| 4,711,313 A | 12/1987 | Iida et al. | |
| 4,765,421 A | 8/1988 | Newton et al. | |
| 4,800,973 A | 1/1989 | Angel | |
| 5,414,225 A | 5/1995 | Garfinkle | |
| 5,440,078 A | 8/1995 | Schuler | |
| 5,894,112 A | 4/1999 | Kroll | |
| 5,994,649 A | 11/1999 | Garfinkle et al. | |
| 6,337,446 B1 | 1/2002 | Hulburt et al. | |
| 6,472,617 B1 * | 10/2002 | Montagnino | 177/126 |
| 6,765,154 B2 | 7/2004 | Sternberg | |
| 6,891,113 B2 * | 5/2005 | Fringeli et al. | 177/238 |
| 7,022,920 B2 | 4/2006 | Hulburt et al. | |
| 7,047,827 B1 | 5/2006 | Mithal | |
| 7,084,357 B2 | 8/2006 | Roberts et al. | |
| 7,282,652 B1 | 10/2007 | Johnson et al. | |
| 7,521,638 B1 * | 4/2009 | Godshaw et al. | 177/126 |
| 2002/0043544 A1 | 4/2002 | Caneba | |
| 2002/0129978 A1 | 9/2002 | Montagnino et al. | |
| 2003/0111275 A1 | 6/2003 | Sternberg | |
| 2004/0124017 A1 | 7/2004 | Jones et al. | |
| 2005/0072604 A1 | 4/2005 | Hulburt et al. | |
| 2006/0118342 A1 | 6/2006 | Hulburt et al. | |
| 2007/0240912 A1 | 10/2007 | Papazissis | |

FOREIGN PATENT DOCUMENTS

FR 2811078 1/2002

* cited by examiner

*Primary Examiner* — Randy W Gibson
(74) *Attorney, Agent, or Firm* — Panitch Schwarze Belisario & Nadel LLP

(57) ABSTRACT

A portable scale having a collapsed and an extended condition is provided by a pair of rigid beams, each generally elongated with opposing longitudinal ends. A weight sensor is provided proximal each opposing longitudinal end of each beam of the pair. Processing and outputting circuitry is supported by a first beam of the pair, the processing and outputting circuitry being electrically connected with each weight sensor in each of the first beam and second. One or more flexible connectors mechanically and electrically connect together the pair of rigid beams in side by side parallel orientation in a collapsed condition of the scale and in an extended condition of the scale. The flexible connectors are the only permanent physical and operable, mechanical and electrical connections between the pair of rigid beams in the extended condition of the scale.

20 Claims, 4 Drawing Sheets

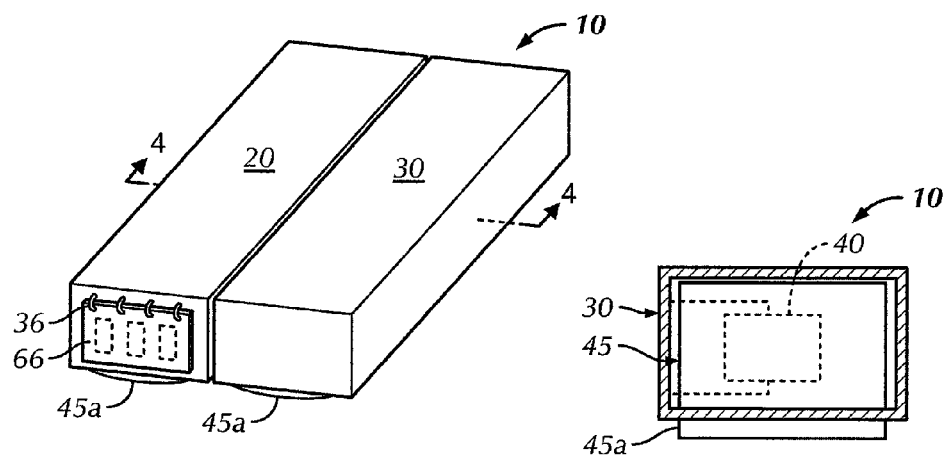
FIG. 1
FIG. 3
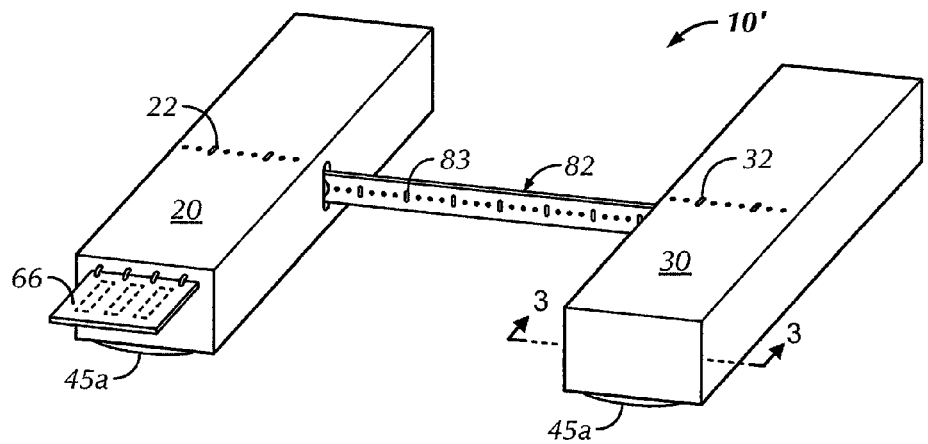
FIG. 2
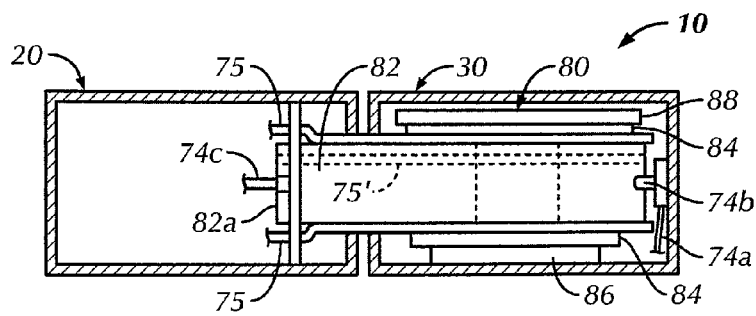
FIG. 4

US 8,017,877 B1

PORTABLE COLLAPSIBLE SCALE

BACKGROUND OF THE INVENTION

In recent years, with competition driving down the prices of airfares, airlines have sought to supplement its average income per passenger by introducing and/or enforcing various fees including excess baggage. As weight restrictions may vary from airline to airline travelers may unexpectedly find themselves at an air terminal with overweight baggage. This is particularly true in returning from vacation where vacation purchases are added to the original luggage contents.

It would be desirable to provide a small, light-weight portable scale that can be collapsed for transport and storage while traveling and used particularly for baggage weighing while traveling.

BRIEF SUMMARY OF THE INVENTION

A portable collapsible scale having a collapsed and an extended condition comprises: a pair of rigid beams, each of the pair of rigid beams being generally elongated with opposing longitudinal ends; a weight sensor proximal each opposing longitudinal end of each of the pair of rigid beams; processing and outputting circuitry supported by a first beam of the pair of rigid beams, the processing and outputting circuitry being electrically connected with each weight sensor in the first beam and with each weight sensor in a second, remaining beam of the pair of rigid beams; and one or more flexible connectors mechanically and electrically connecting together the pair of rigid beams in side by side parallel orientation in a collapsed condition of scale and an extended condition scale and being the only connections between the pair of rigid beams in the extended condition of the scale.

Alternatively, a portable collapsible scale having a collapsed and an extended condition comprises: a pair of rigid beams, each of the pair of rigid beams being generally elongated with opposing longitudinal ends; a weight sensor at each opposing longitudinal end of each of the pair of rigid beams; processing and outputting circuitry supported by a first beam of the pair of rigid beams, the processing and outputting circuitry being electrically connected with each weight sensor in the first beam and with each weight sensor in a second, remaining beam of the pair of rigid beams; and one or more flexible tape connectors connecting together the pair of rigid beams in side by side parallel orientation in a collapsed condition of the scale and an extended condition of the scale.

A method of weighing an object such as baggage including the steps of supplying a portable collapsible scale with only flexible connectors mechanically and electrically connecting together a pair of rigid beams; separating the beams from one another connected together by the flexible connectors; placing the object to be weighed on the beams; and outputting weight of the object to a user.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings, which are diagrammatic:

FIG. 1 is a perspective view of a first embodiment of the invention in collapsed form for transport or storage;

FIG. 2 is a perspective view of the first embodiment of FIG. 1 in an expanded form for use;

FIG. 3 is a cut away side elevation of FIG. 2 along the lines 3-3;

FIG. 4 is a cut away side elevation of FIG. 1 along the lines 4-4;

DETAILED DESCRIPTION OF THE INVENTION

Figure 5:
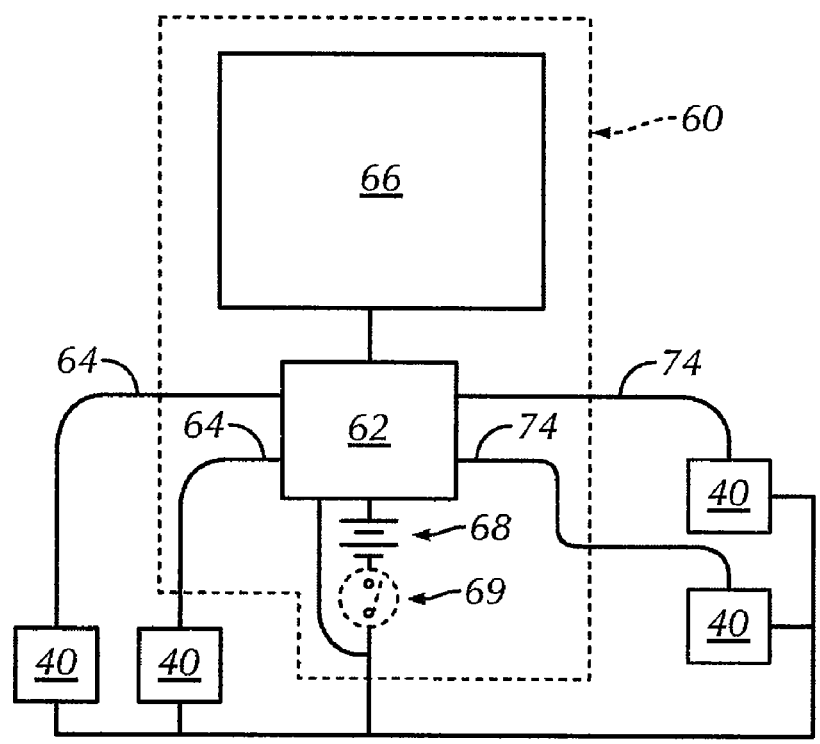
FIG. 5 is a block diagram of the electrical circuitry of the scale of FIGS. 1-4.

In the figures, like numbers are used for like elements. FIG. 1 depicts a first embodiment portable collapsible scale according to the present invention indicated generally at 10 in a collapsed condition in FIG. 1 and indicated generally at 10' in FIG. 2 in an extended condition. Portable collapsible scale 10 comprises a pair of rigid beams 20, 30. Each of the pair of rigid beams 20, 30 is generally elongated with opposing longitudinal ends. A weight sensor 40 is provided proximal each opposing longitudinal end of each rigid beam 20, 30.

Processing and outputting circuitry 60 is supported by a first beam 20 of the pair of rigid beams and is electrically connected with each weight sensor 40 in the first beam 20 and with each weight sensor 40 in a second, remaining beam 30 of the pair of rigid beams. Finally, one or more flexible connectors, a flexible tape connector being shown and indicated at 82 in FIG. 2, is provided mechanically and preferably electrically connecting together the pair of rigid beams 20, 30 in side by side orientation in the collapsed condition of scale 10 shown in FIG. 1 and in the extended condition scale 10' shown in FIG. 2.

Beams 20, 30 may be of any transverse cross-sectional configuration. However, a rectangular or "box" construction as shown is suggested for strength. Furthermore, as can be seen in FIGS. 3 and 4, the side by side beams 20, 30 define a plane of the scale 10 and each beam 20, 30 is preferably elongated in cross-section in the plane of the scale 10 in a width dimension, compared to a height cross-sectional dimension of the beam 20, 30 for stability.

While the weight sensors 40 may be any of a variety of different types, preferably each weight sensor is provided in the form of a self-contained load cell indicated diagrammatically at 45 in FIG. 3. Each beam 20, 30 has proximal each of its opposing longitudinal ends, a weight sensor 40 in the form of one of the load cell 45. The load cell 45 is mounted on or in the beam 20, 30 in an appropriate way for the weight of the bag or other object being weighed to be applied to and sensed by the cell 45. Preferably, a lowermost portion of each load cell 45 forms a foot 45a on which the beam 20 or 30 and the scale 10/10' is supported in use. Alternatively, the feet 45a may be simply mechanical actuators mounted to bear directly or indirectly against a weight sensor that might be used and fixed within the beam. The load cells 45 suggestedly are simply commercially available load cells of a conventional construction outputting an electrical signal related to the force applied to the cell 45 with a load placed on the scale 10'.

Preferably, flexible tape connector 82 is a resiliently flexible metal tape like that commonly used in reel mounted, retractable measuring tape rulers. Preferably the flexible tape connector 82 is even provided with length markings 83 (see FIG. 2) so as to be used to measure the dimensions of objects such as luggage, for example to verify that it is within airline limits for normal handling or carry-on. The markings could be extended onto the beams (22, 32 in phantom in FIG. 2).

Resilience is provided by an arcuate or curved cross sectional shape of such tape 82. Preferably, the flexible tape connector 82 is part of a flexible tape assembly indicated generally at 80 in FIG. 4, which makes the flexible tape connector 82 extendable and retractable as the scale is extended and collapsed. Assembly 80 includes the flexible tape 82 mounted on a reel 84 for extension and retraction as the scale is extended and collapsed. Reel 84 may be supported for simple rotation with a frictional drag such as an elastomeric washer 86 so that the reel 84 does not freely rotate but rather requires the tape 82 to be dragged from the reel 84 to unwind and, if sufficiently resilient, to be forced back into the beam 20 or 30 causing the reel 84 to rewind while taking up tape 82. Alternatively, or in addition, the assembly 80 can further include a torsion spring or the like (not separately depicted) operably connected to the reel 84 to be loaded by the reel 84 when the tape 82 is unwound and to be unloaded through the reel 84 to rewind the tape 82 on the reel 84. The spring can be sufficiently strong to hold the beams 20, 30 together in the collapsed condition scale 10 as shown in FIG. 1. Also, each reel assembly 80 can includes a ratchet releasable locking assembly indicated in block diagram form at 88 of a type previously used in reel mounted pocket measuring tapes or a ratchet releasable locking assembly of the type long used in the support rods of conventional window shades. Each ratchet releasable locking assembly 88 would include a ratchet wheel on the reel and a pawl or the like to releasably lock the reel 84 with the tape 82 in the extended, operating condition shown in FIG. 2 and to release the reel to rewind the tape, returning the device 10 to its collapsed condition shown in FIG. 1. Still alternatively, a manual slide stop like those used on some pocket measuring tapes to frictionally hold the tape 82 in the extended condition might be provided on the sidewall of the beam housing the assembly 80.

The collapsible scale 10/10' further includes processing and outputting circuitry indicated generally at 60 in FIG. 5 in block diagram form. Circuitry 60 includes control circuitry or "controller" 62 coupled by conductive lines 64 and 74 to the weight sensors 40/load cells 45 of the first and second beams 20, 30, respectively. Also connected to the controller 62 is an output device 66, which is preferably a visual display device like an LED or LCD display of at least three characters (as indicated in phantom in FIG. 4), or an audio speaker (not depicted), or both; and a self contained power supply 68 like a battery, which powers all components of the circuitry 60 and the weight sensors 40. A manually operated ON-OFF power switch 69 can also be provided. Controller 62 includes a microprocessor or like circuitry along with any buffering and conversion circuitry (e.g. ADC/DCA for the sensors 40). The controller 62 is programmed or otherwise configured to determine total load weight from the outputs of the four sensors 40 and to drive the output device(s) 66 to output the determined weight to the user. Preferably, the processing and outputting circuitry 60 is supported by one of the beams such as the first beam 20 and is housed within a beam 20 for protection with the output device(s) exposed as much as is necessary to provide information to the user. For example, display 66 may be fixed at one end of the first beam 20, pitched at an angle from the vertical to point upward toward the user, or may be connected by a hinge 36 to fold between a pitched, operative position and a vertical, stowed position.

FIG. 4 illustrates one possible electrical connection indicated generally at 74 between one weight sensor 40/load cell 45 in the second beam 30 and the processing and outputting circuitry 60 of the first beam 20. Electrical connection 74 is provided by a length of flexible wire 75 that is itself connected at its opposite ends with a weight sensor 40/load cell 45 in the second beam 30 and the processing and outputting circuitry 60 in the first beam 20. Wire 75 is physically attached to an outer surface of the flexible tape connector 82 along one side edge of the connector 82 as indicated. Alternatively, the wire 75 can be connected along one of the opposing major sides of the tape connector 82 as indicated in phantom at 75'. A wire connector to the other weight sensor 40/load cell 45 can also be attached along the remaining side edge or one of the major sides of tape connector 82. Further according to another aspect of the invention, the flexible tape connector 82 itself also provides an electrical connection between at least one of the weight sensors 40 in the second beam 30 and the processing and outputting circuitry 60 being supported by the first beam 20. Preferably the flexible tape connector 82 is metal and an electrical connection such as a circuit ground connection between both weight sensors 40/load cells 45 in the second beam 30 and the processing and outputting circuitry 60 in the first beam 20 is made through the metal of the flexible tape connector 82 itself. The connection 74 may include a wire 74a connecting at least one sensor 40/cell 45 to a wiper 74b in physical and electrical connection with tape 82 and another wire 74c physically and electrically connecting a distal end 82a of tape 82 secured in the beam 20 with the controller 62 or battery power supply 68, depending on how the circuitry 60 is configured. It is noted that the flexible wire connectors(s) 75, if provided, and the flexible tape connector 82 constitute the only electrical and mechanical connections between the rigid beams 20, 30 in the extended condition of the scale 10'.

Figure 6:
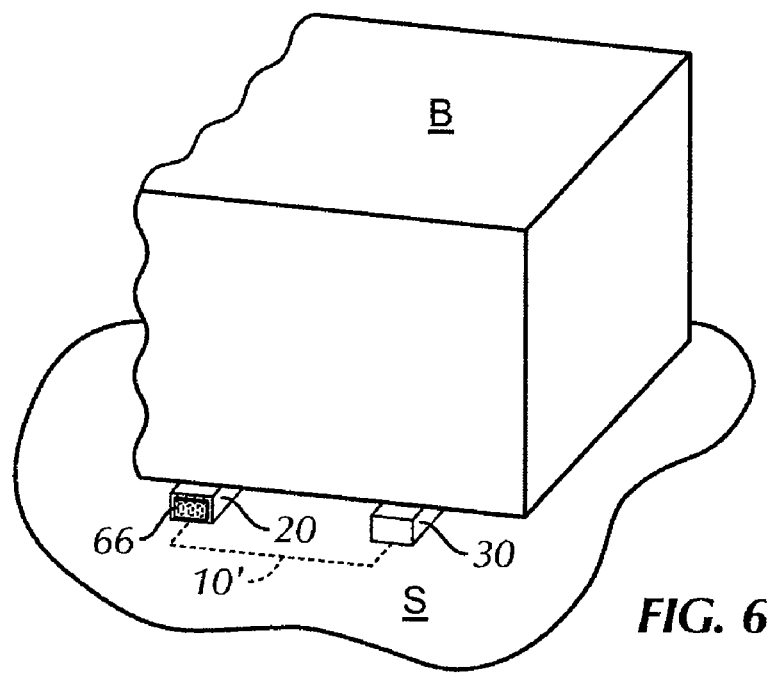
FIG. 6 shows the scale of FIGS. 1-5 in use.

FIG. 6 illustrates the use of the scale of FIGS. 1-4. The beams 20, 30 are separated from one another to the extent desired (or permitted) by the flexible tape connector 82 to configure the scale in its extended condition 10' as shown in FIG. 2. The beams 20, 30 are oriented by the user generally side by side parallel to one another with their feet 45a against an underlying support surface S. A bag B or other load is placed across the beams 20, 30. The weight of the bag B or other load is determined by the processing and outputting circuitry 60 and displayed to the user through the display 66 at one longitudinal end of the first beam 20.

Figure 7:
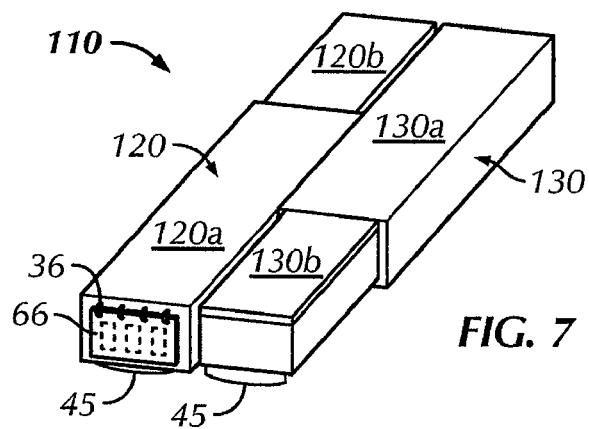
FIG. 7 is a perspective view of a second, preferred embodiment of the invention in collapsed form for transport or storage.
Figure 8:
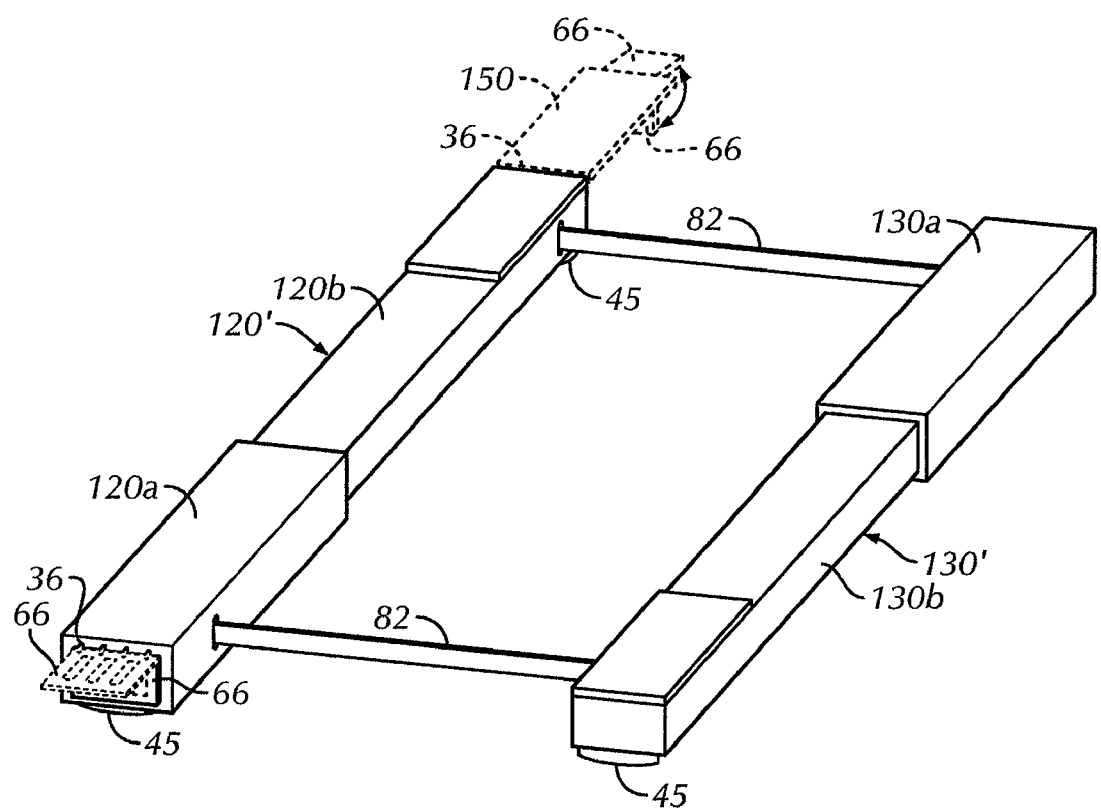
FIG. 8 is a perspective view of the second embodiment of FIG. 5 in an expanded form for use.

FIGS. 7 and 8 depict a second, preferred embodiment portable collapsible scale of the present invention indicated generally at 110 in a collapsed condition in FIG. 7 and at 110' in an extended condition in FIG. 8. Scale 110/110' includes a pair of rigid beams, a first rigid beam 120 and a second rigid beam 130. Preferably, each of the pair of rigid beams 120, 130 is formed by at least first and second telescopic sections 120a, 120b and 130a, 130b, respectively. Each beam 120, 130 has two sections, an outer section 120a, 130a and an inner section 120b, 130b telescopically slidingly received in the outer section 120a, 130a, respectively. Each of the first and second telescopic sections 120a, 120b, 130a, 130b forms one of the opposing longitudinal ends of the respective beam 120, 130. Again while beams 120, 130 may be of any transverse cross-sectional configuration, a rectangular or "box" construction, preferably a "flattened" box with a width greater than its height, is suggested for strength and stability. Each beam 120, 130 can be manually adjusted between a longitudinally collapsed condition indicated in FIG. 7 and a longitudinally extended condition indicated in FIG. 8, where the same beams have been renumbered 120', 130' to distinguish them from their collapsed condition in FIG. 7.

Again, each beam 120, 130 has proximal each of its opposing longitudinal ends, a weight sensor 40 preferably in the form of the conventional, self-contained load cell indicated at 45. Preferably, each of the first and second telescopic sections 120a, 120b, 130a, 130b supports a separate weight sensor 40/load cell 45.

Also according to the invention, beam 130/130' is mechanically and operably (i.e., electrically) connected with beam 120/120' through at least one and, more preferably, through a pair of the extendable and retractable, flexible tape assemblies 80. Scale 110/110' is provided with two of the flexible tape connectors 82 mechanically connecting together the pair of rigid beams 120, 130 in side by side parallel orientation in the collapsed condition 110 and the extended condition 110' of the scale. Preferably still, each tape connector 82 connects separate pairs of the telescopic sections 120a/130b and 120b/130a together. Again, each tape connector 82 further preferably further provides at least one electrical connection between at least one of the weight sensor 40/load cell 45 in one beam 130 and processing and outputting circuitry 60 in the other beam 120. Preferably, the tape connector 82 closest to the weight sensor 40/load cell 45 in the second beam 130 can used be used as part of the electrical connection between that weight sensor 40/load cell 45 and the controller 62. If only one conductor connection 74 is required between that weight sensor 40/load cell 45 and the controller, the tape 82 can be metal and can be directly used as part of that connection 74 as indicated in FIG. 4. Alternatively, one or more flexible, electrically conductive wires can be attached to or integrated into the tape 82, on (or even in) one of the major surfaces or along the side edges of the tape, or one or more layers of a flexible electrical connector like a conductive polymeric material can be printed on or otherwise laid down along one of the major surfaces of a metal flexible tape 82 made non-conductive by the provision of a non-conductive layer on the metal material of the tape 82 to unwind and rewind with the tape 82.

In this embodiment 110/110', squat load cells 45 are preferably employed that can be affixed to the bottom surfaces of the beams 120, 130 or if extended into the beams, still provide sufficient room to position the adjoining tape assembly 80 and its reel 84 above the load cell 45.

Processing and outputting circuitry 60 can again be located in one of the two beams, e.g. first beam 120 for protection. Alternatively, the circuitry 60 might be located in a protective housing 150 supported (in phantom) by one of the beams, e.g. beam 120. For example, housing 150 may be slidably mounted to the beam 120 to telescope from the end of section 120b. Alternatively, housing 150 may be mounted on a separate extension member (not depicted), which is itself slidably mounted on the beam 120. In either case, display 66 may be coupled to the end of the housing 150 or extension member (if either is provided) or to the end of beam 120 by a hinge mechanism 36 to fold down when the scale 110 is in the collapsed configuration.

It will be appreciated by those skilled in the art that changes could be made to the embodiments described above without departing from the broad inventive concept thereof. While only two section telescopic beams are disclosed, each beam can include three or more telescopic sections. Although a generally square or flatten rectangular cross-section is preferred for beams 20, 30, other cross-sectional shapes including circular, oval or other polygonal shapes can be used. While one or two reel assemblies 80 are disclosed, three or more assemblies can be provided. Furthermore, while open frame configurations of the scales have been described for use particularly with luggage, it will be appreciated that the scales can be temporarily used with a platform or other container that is placed on the extended scale to receive and weigh people or other things. The processor/display could be provided with a tare adjustment for such use. However, the only permanent physical and operable connection between the beams 20/30, 120/130 remain the various flexible connectors which have been described.

Figure 9:
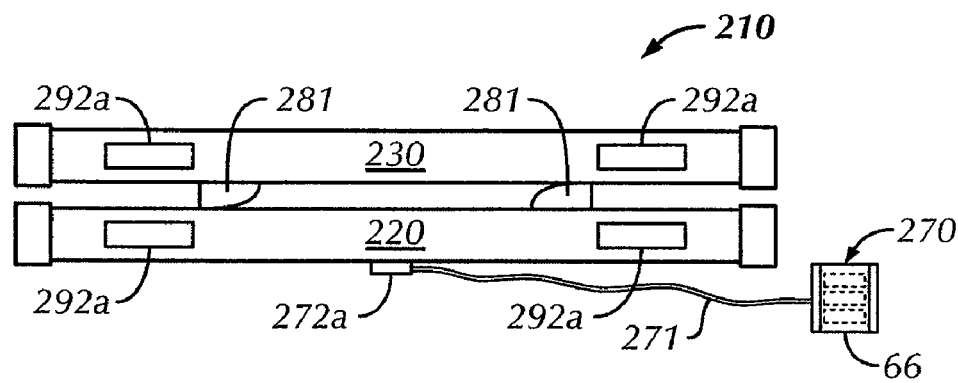
FIG. 9 is a top plan view of a third embodiment portable collapsible scale of the invention in a collapsed form.
Figure 10:
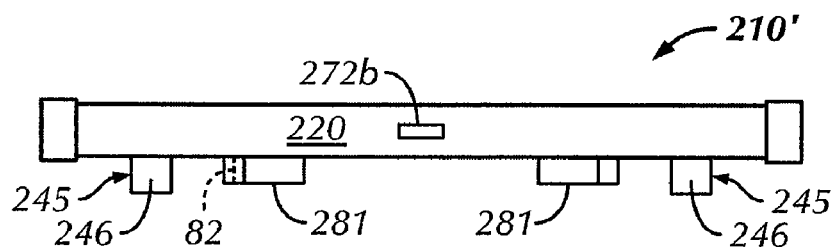
FIG. 10 is an elevation view of the portable collapsible scale of FIG. 9.
Figure 11:
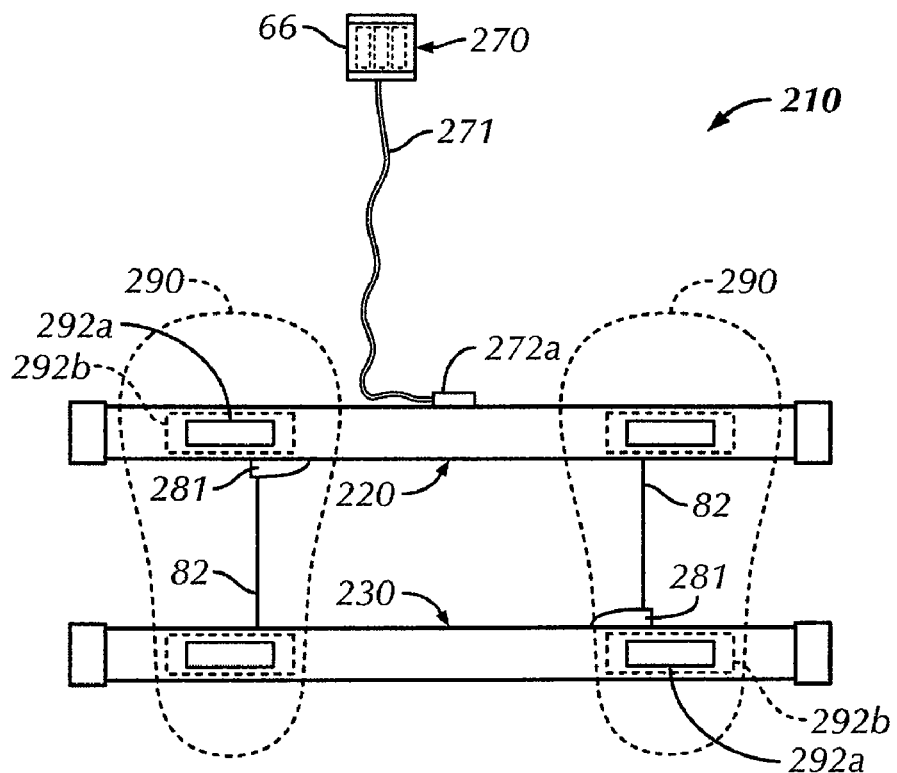
FIG. 11 is a perspective view of the portable collapsible scale in an expanded form for one possible use.

FIGS. 9-11 depict a third embodiment portable collapsible scale incorporating some of these and other differences. The scale is indicated at 210 in the collapsed condition in FIG. 9 and at 210' in the extended condition in FIG. 11. Portable collapsible scale 210/210' comprises a pair of rigid beams 220, 230. Each of the pair of rigid beams 220, 230 is generally elongated with opposing longitudinal ends and to reduce weight, is made of molded or extruded plastic. A weight sensor 40 is provided proximal each opposing longitudinal end of each rigid beam 220, 230. In particular, squat load cells 245 in their own cylindrical housings 246 are attached to what is a bottom side of each rigid beam.

Processing and outputting circuitry 60 is again supported by a first beam 220 of the pair of rigid beams and is electrically connected with each weight sensor 40 in the first beam 220 and with each weight sensor 40 in a second, remaining beam 230 of the pair of rigid beams. However, in this embodiment, the circuitry 60 is located with the display 66 in its own housing 270 and is preferably coupled with the sensors 40/load cells 245 through a flexible, multiconductor cord 271 and a pair of mating plug/socket connectors 272a, 272b so that the housing 270 can be removed and carried separately and the display 66 can be easily extended from the first rigid beam 220 for visibility in use. Instead of a flexible cord 271, a relative rigid, multiconductor, plug-in stalk (not depicted) may be provided with the housing 270 and circuitry 60 at an end opposite the provided plug connector.

Finally, one or more flexible connectors, in this instance two, identical, flexible tape connectors being shown and indicated at 82 in FIG. 11, are provided mechanically and preferably electrically connecting together the pair of rigid beams 220, 230 in side by side orientation in the collapsed condition of scale 210 shown in FIG. 9 and in the extended condition scale 210' shown in FIG. 11. However, unlike the earlier scale embodiments described above, the flexible tape connectors are parts of flexible tape assemblies 80, which are located in their own housings 281 fixedly mounted on again what is the bottom side of rigid beams 220, 230. Similarly, the distal each flexible tape connector is mechanically and electrically coupled with a terminal member 285 extended downwardly from a bottom side of the opposing beam 220, 230. Any electrical conductors on the tape member 82 are similarly electrically connected with the circuitry 60 or the weight sensor(s) 40 in the respective beam 220, 230. In this embodiment 210/210', the flexible tape assemblies 80 and their housings 281 and the terminal members 245 are located at similar positions along their respective beams 220, 230 so that beams 220, and 230 are externally identical except for the plug connector 272b visible on the side of the first rigid beam 220. Alternatively, both tape assemblies 80 could be mounted to the same beam, preferably the beam 220 supporting the circuitry 60, and the two terminal members 245 mounted to the remaining beam 230.

FIG. 11 also illustrates the use of one type of platform with the scale 210'. A pair of foot shaped platforms 290 (in phantom) are provided to be releasably and removably fastened to the beams 220, 230 with the scale 210' in the extended condition to adapt the scale 210' for personal weight measurement. Lengths 292a of hook or loop flexible fabric releasable fasteners are fixed in spaced apart locations on what is the top side of each of the rigid beams 220, 230. Lengths of the remaining type of hook and loop flexible fabric releasable fasteners 292b (in phantom in FIG. 11) are fixed in spaced apart locations on what is the bottom side of each of the foot shaped platforms 290 to releasably fasten the platforms 290 in spaced apart positions on the separated rigid beams 220, 230. Different releasable fasteners can be provided such as but not limited to, flexible straps with hook and loop members or buckles or twistable wire cores or pins on the foot shaped platforms 290 received in holes provided in the tops of the beams 220, 230.

While resiliently flexible metal tapes are preferred, alternative flexible connectors/conductors could be used. For example, instead reel mounted flexible metal tapes, which have a curved cross-section to provide rigidity to the tape when the tape is unreeled, other types of flexible members, for example, flat ribbon or even insulated wire, might be employed, with or without a reel mounting. Such flexible members would also constitute, incorporate or carry one or more electrical conductors to provide electrical connection between the load cells in one of the beams and the processing and outputting circuitry in the other beam. Such ribbon or wire could be made resiliently flexible in a normally curled state, for example made of an appropriate metal alloy that is slightly hardened only sufficiently so that the ribbon or wire would tend to curl when all tension is removed and the ribbon or wire remain rigid enough to be manually fed back through a small opening into a beam after extension from the beam for use. The ribbon or wire would not be so hardened that the metal will curl when the device is opened up and placed on a floor surface or the ground for use.

Furthermore, while storage of the flexible tape(s)/ribbon(s)/wire(s) in the beam(s) is desired, it will be appreciated that the tape(s)/ribbon(s)/wire(s) may be somewhat resiliently flexible or completely flexible and fixed between the two beams without retraction into either beam. In such configuration, the tape(s)/ribbon(s)/wire(s) would simply be wrapped around one of the two beams until the beams were brought together abutting one another with wraps of the tape(s)/ribbon(s)/wire(s) around one of the beams and between the two beams. If resiliently flexible, suggestedly the natural, unloaded state of each would be linearly extended so they would tend to keep the beams apart when extended. It further will be appreciated that such tape(s)/ribbon(s)/wire(s) would be under load when wrapped around one of the beams. Simple plastic rectangular clips or fabric fasteners or the like can be provided, sized to fit around the ends of the beams when the resiliently flexible or fully flexible connectors/conductors are wrapped around one of the beams to hold the beams together. Such clips or other fasteners could also be provided for any of the described embodiments.

Current airline regulations limit checked baggage to a maximum linear dimension (length plus width plus height) of sixty-two inches. Since checked baggage is not cubic in shape, it typically has at least one and sometimes two smaller dimensions (width and/or height) of less that twenty inches. Accordingly, the maximum length of the rigid beams (fixed or extended) need not be any more than two feet in length to span a minimum dimension of the bag but suggestedly should be at least one foot in length for convenience of use.

It is understood, therefore, that this invention is not limited to the particular embodiments disclosed, but it is intended to cover modifications within the spirit and scope of the present invention as defined by the appended claims.

I claim:

1. A portable collapsible scale having a collapsed condition and an extended condition comprising:
   a pair of rigid beams, each of the pair of rigid beams being generally elongated with opposing longitudinal ends;
   a weight sensor proximal each opposing longitudinal end of each of the pair of rigid beams;
   processing and outputting circuitry supported by a first beam of the pair of rigid beams, the processing and outputting circuitry being electrically connected with each weight sensor in the first beam and with each weight sensor in a second, remaining beam of the pair of rigid beams; and
   one or more flexible connectors mechanically and electrically connecting together the pair of rigid beams in side by side parallel orientation in the collapsed condition of the scale and in the extended condition of the scale and being the only connections of the scale between the pair of rigid beams in the extended condition of the scale, wherein each of the one or more flexible connectors is mounted on a reel for extension and retraction as the scale is extended and collapsed.

2. The portable collapsible scale of claim 1 wherein at least one of the flexible connectors is a flexible tape connector providing an electrical connection between at least one of the weight sensors in the second beam and the processing and outputting circuitry in the first beam.

3. The portable collapsible scale of claim 2 wherein the flexible tape connector is metal and one electrical connection is through the metal of the flexible tape.

4. The portable collapsible scale of claim 3 further comprising a separate electrical connection between the pair of beams on an outer surface of the flexible tape connector.

5. The portable collapsible scale of claim 2 wherein at least one electrical connection between the pair of beams is carried on an outer surface of the flexible tape connector.

6. A portable collapsible scale having a collapsed condition and an extended condition comprising:
   a pair of rigid beams, each of the pair of rigid beams being generally elongated with opposing longitudinal ends;
   a weight sensor proximal each opposing longitudinal end of each of the pair of rigid beams;
   processing and outputting circuitry supported by a first beam of the pair of rigid beams, the processing and outputting circuitry being electrically connected with each weight sensor in the first beam and with each weight sensor in a second, remaining beam of the pair of rigid beams; and
   one or more flexible connectors mechanically and electrically connecting together the pair of rigid beams in side by side parallel orientation in the collapsed condition of the scale and in the extended condition of the scale and being the only connections of the scale between the pair of rigid beams in the extended condition of the scale;
   wherein each of the pair of rigid beams is formed by at least first and second telescopic sections, each of the first and second telescopic sections forming one of the opposing longitudinal ends of the respective beam and each of the first and second telescopic sections supporting one of the weight sensors.

7. A portable collapsible scale having a collapsed condition and an extended condition comprising:
   a pair of rigid beams, each of the pair of rigid beams being generally elongated with opposing longitudinal ends;

a weight sensor at each opposing longitudinal end of each of the pair of rigid beams;

processing and outputting circuitry supported by a first beam of the pair of rigid beams, the processing and outputting circuitry being electrically connected with each weight sensor in the first beam and with each weight sensor in a second, remaining beam of the pair of rigid beams; and one or more flexible tape connectors connecting together the pair of rigid beams in side by side parallel orientation in the collapsed condition of the scale and in the extended condition of the scale;

wherein each of the pair of rigid beams is formed by at least first and second telescopic sections, each of the first and second telescopic sections forming one of the opposing longitudinal ends of the respective beam and each of the first and second telescopic sections supporting one of the weight sensors.

8. The portable collapsible scale of claim 7 wherein the flexible tape connector is metal and one electrical connection is through the metal of the flexible tape.

9. The portable collapsible scale of claim 8 further comprising a separate electrical connection between the pair of beams on an outer surface of the flexible tape connector.

10. The portable collapsible scale of claim 7 wherein an electrical connection between the pair of beams is carried on an outer surface of the flexible tape connector.

11. The portable scale of claim 7 wherein an electrical connection between the pair of beams is carried on an outer surface of the flexible tape connector.

12. The portable collapsible scale of claim 1 in combination with a platform removably attachable to the scale so as to sit on top of the scale.

13. The portable collapsible scale of claim 6 in combination with a platform removably attachable to the scale so as to sit on top of the scale.

14. The portable collapsible scale of claim 7 in combination with a platform removably attachable to the scale so as to sit on top of the scale.

15. The portable collapsible scale of claim 1 in combination with a platform releasably attachable to the scale so as to sit on top of the scale.

16. The portable collapsible scale of claim 6 in combination with a platform releasably attachable to the scale so as to sit on top of the scale.

17. The portable collapsible scale of claim 7 in combination with a platform releasably attachable to the scale so as to sit on top of the scale.

18. The portable collapsible scale of claim 1 wherein the processing and outputting circuitry comprises circuitry operably coupled with each of the weight sensors and with a weight output device selected from a visual display and a speaker.

19. The portable collapsible scale of claim 6 wherein the processing and outputting circuitry comprises circuitry operably coupled with each of the weight sensors and with a weight output device selected from a visual display and a speaker.

20. The portable collapsible scale of claim 7 wherein the processing and outputting circuitry comprises control circuitry operably coupled with each of the weight sensors and with a weight output device selected from a visual display and a speaker.

* * * * *